Patented June 26, 1951

2,558,378

UNITED STATES PATENT OFFICE 2,558,378

COMPOSITION FOR FLOOR AND WALL COVERING COMPRISING PLASTICIZED VINYL RESIN AND FILLER AND METHOD OF MAKING SAME

Robert K. Petry, Wilmington, Del., assignor to Delaware Floor Products Inc., a corporation of Delaware No Drawing. Application January 15, 1947, Serial No. 722,291

8 Claims. (Cl. 260—41)

This invention relates to improved compositions and to improved sheets or films consisting of such compositions for floor and wall coverings and to methods of manufacturing the same.

In the present invention, a composition is provided for making a sheet material for floor and wall covering which is thermoplastic and contains no material that requires drying, curing or vulcanization to condition it for use in atmosphere-exposed and treading surfaces. The sheet is prepared merely from a mixture containing a relatively high proportion of filler material, and sufficient binder consisting of a plasticized, thermoplastic, elastomeric polymer to render the sheet hard and compact, and yet flexible or pliable, resilient, and elastic.

Sheets for floor and wall covering in which the exposed surface must undergo a chemical change, such as oxidation or polymerization by stoving or vulcanization by the action of certain chemical reagents and catalysts or accelerators, do not yield as uniform a wearing surface as a thermoplastic sheet. The chemical changes do not consistently occur at a uniform rate throughout the thickness of a sheet requiring such chemical treatment. Furthermore these changes usually continue at a slower rate after the wear surface is cured to the desired state. Thus, many products deteriorate upon aging. Some lose their flexibility because of continued hardening and oxidation. If the curing cycle is not carried far enough during production, the finished products are too soft and otherwise unsatisfactory.

It has been conventional practice in the manufacture of floor and wall covering from plastics to mix filler material with binder material containing a drying oil or a rubber or rubber-like substance that must be cured or vulcanized by long period treatments to render the filled product suitable for use in wear or decorative surfaces. Such products if initially hard and rigid are used in tile or panels, and if initially flexible are in time apt to crack too easily and to become brittle and readily friable. Also, in the manufacture of a filled plastic mix, it has been customary to add to the filler and/or plastic a solvent or moistening agent or other additive to facilitate distribution of the filler in the plastic.

In contrast to the above practices, the product of the present invention is prepared without drying oil, natural or synthetic rubbers, or other substances requiring aging, curing or vulcanization. The vinyl polymers, plasticizers and filler materials employed in the ranges of proportions mentioned hereinbelow are thoroughly mixed without the addition of other substances including water and volatile solvents. The mixing is accomplished under conditions of heating at prescribed temperatures, whereafter the mix is pressed into compact, non-porous sheets of suitable thickness. After the sheets are cool and hard they are ready for immediate use in floor and wall covering.

The thermoplastic, elastomeric polymers employed in the present invention are preferably vinyl polymers in the high viscosity range. Preferred among the latter are the polymers of vinyl chloride, vinyl acetate, vinyl butyral, and copolymer of vinyl chloride and vinyl acetate. A copolymer which has proven satisfactory is one prepared from 93 to 95 per cent vinyl chloride and the balance vinyl acetate, with an average molecular weight of approximately 24,000 as determined by the Staudinger method, and having a specific gravity of about 1.34 to 1.37, and softening at approximately 150° F. These abovementioned polymer materials, when formed for present purposes, require no chemical or other treatment except the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxy ethyl phthalate, dibutoxyglycol phthalate, polyethyleneglycol di-2-ethyl hexoate, triethylene-glycol di-2-ethyl hexoate and the like.

The filler material employed contains preferably both pigment and fiber, though either may be used alone for some purposes. Examples of pigments are asbestine, barytes, calcium carbonate, calcium sulfate, clay, dolomite, mica, silica, slate flour, serpentine, talc. Colored pigments such as chrome green, chrome yellow, carbon black, titanium dioxide and others are used in solid colored or varicolored sheets.

Fibrous fillers include, for example, asbestos, cork, wood flour, cellulose fibers in general, and others, including animal fiber such as leather.

The particle size of the pigment fillers should be such that they will pass through 325 mesh screen. Fibrous fillers such as wood flour should pass through a 50 mesh screen, though finer grades can be used. Asbestos fiber employed is commonly called "shorts" and passes completely through a 10 mesh screen.

Traces of lubricants such as stearic acid, and metallic stearates, and of stabilizers such as basic lead carbonate, basic lead silicate, and basic lead stearate are generally added to the mix.

In preparing the mix, the plasticized polymer material and filler material, with or without, but preferably with, a trace of the lubricant and of the stabilizer, are heated together in a Banbury mixer at a temperature within the approximate range of 300° F. to 350° F. and the filler is thoroughly dispersed in the plastic. No other materials including solvents, diluents and moistening agents need be added. A period of only two or three minutes is required for this mixing.

The mix is formed into a sheet on heated rolls preferably within the above temperature range, and when reduced to proper thickness and cooled on cooling rolls or other means, the sheet can be immediately used, or otherwise handled or applied to supporting bases.

The mix contains substantially 50% to substantially 75% by weight of filler material. These limits should not vary more than one to five percent. A ration of pigment filler to fibrous filler that is particularly desirable and advantageous is two parts by weight of pigment to one part by weight of fiber. Preferably not more than fifty percent of fiber is used in the mixed filler, thoroughly and uniformly distributed.

Expressed in parts by weight, a mix for preparing a sheet contains from about 16 to about 38 parts of the polymer, about 7 to about 18 parts of the plasticizer, and about 50 to about 75 parts of filler. Optimum proportions are about 23 parts of polymer, about 12 parts of plasticizer, and about 65 parts of filler. A compounded sheet containing the various pigments and fillers in the proportions stated has a preferred specific gravity of 1.85 to 1.90. Depending on the types of fillers and to some extent the proportion thereof, the specific gravity may be as low as 1.5.

Examples of complete preferred formulae of mixes are as follows:

*Example 1* — Parts by weight

| | |
|---|---|
| Co-polymer of vinyl chloride and vinyl acetate | 351 |
| Tri cresyl phosphate | 140 |
| Asbestos fiber | 125 |
| Wood flour | 30 |
| Dry ground limestone | 320 |
| Stearic acid | 2 |
| Basic lead carbonate | 7 |
| Chrome green | 25 |

This formula represents 50% filler content.

*Example 2* — Parts by weight

| | |
|---|---|
| Co-polymer of vinyl chloride and vinyl acetate | 316 |
| Di octyl phthalate | 126 |
| Asbestos fiber | 140 |
| Wood flour | 30 |
| Dry ground limestone | 100 |
| Silica flour | 215 |
| Stearic acid | 2 |
| Basic lead silicate | 6 |
| Titanium dioxide | 50 |
| Chrome green | 15 |

This formula represents 55% filler content.

*Example 3* — Parts by weight

| | |
|---|---|
| Co-polymer of vinyl chloride and vinyl acetate | 243 |
| Tri cresyl phosphate | 131 |
| Asbestos fiber | 155 |
| Wood flour | 40 |
| Silica flour | 325 |
| Stearic acid | 1 |
| Basic lead carbonate | 5 |
| Titanium dioxide | 100 |

This formula represents 62% filler content.

*Example 4* — Parts by weight

| | |
|---|---|
| Co-polymer of vinyl chloride and vinyl acetate | 236 |
| Di octyl phthalate | 54 |
| Tri cresyl phosphate | 54 |
| Asbestos fiber | 125 |
| Wood flour | 80 |
| Dry ground limestone | 210 |
| Silica flour | 210 |
| Barium stearate | 1 |
| Basic lead silicate | 5 |
| Chrome yellow | 25 |

This formula represents 65% filler content.

*Example 5* — Parts by weight

| | |
|---|---|
| Co-polymer of vinyl chloride and vinyl acetate | 176 |
| Di octyl phthalate | 70 |
| Asbestos fiber | 235 |
| Dry ground limestone | 485 |
| Stearic acid | 1 |
| Basic lead carbonate | 3 |
| Carbon black | 30 |

This formula represents 75% filler content.

In the above examples, the proportion of fibrous filler with respect to the total filler material is at least about 30.9% by weight (Example 2). A range of proportions of the fibrous filler in the filler material is from 30.9% to 50%.

Sheets of a thickness of about 0.010 inch to 0.125 inch or thicker are formed from the mixes described and can be wound into rolls without cracking or sticking. The thinner sheets will not crack even when creased; and the thicker sheets can, without cracking, be bent over a rod having the diameter of a pencil, or of one-half inch and less. When dented or otherwise deformed, a sheet is sufficiently resilient to return in time to its original shape, or redintegrate or restore its original even surface. Besides having the outstanding qualities above mentioned, this sheet is highly wear-resistant, highly resistant to saponification by alkali or other alkaline agents, and is tough, having high tensile strength. When a piece is accidentally or otherwise severed, or if several stray pieces are at hand, a continuous sheet is readily formed by placing the pieces edge to edge and applying heat and pressure. Different colored pieces may also be thus joined to provide figured decorations that extend through the entire thickness of a finished sheet. At a temperature of over 300° F. a perfect joint between pieces is made with no visible seam and as strong as the original sheet.

Also scraps of sheets may be reworked by reheating, mixing and re-rolling. In this recovery process pigment may be added to brighten or change the original color. If necessary additional plastic may be added to balance properly the proportions of the constituents.

Other advantages will be apparent to those skilled in the art to which the present invention relates. The invention as hereinabove set forth is embodied in particular form and manner but may be variously embodied within the scope of the claims hereinafter made.

I claim:

1. In a process of manufacturing floor and wall covering material, thoroughly admixing and heating together, in absence of water and volatile solvent, material consisting of substantially 50% to substantially 75% by weight of filler particles and substantially 25% to substantially 50% by weight of a binder consisting of a plasticized, thermoplastic, elastomeric polymer, at a temperature of about 300° F. to about 350° F. to substantially uniformly disperse the filler material in the said plasticized polymer, which polymer is selected from a group consisting of polyvinyl chloride, polyvinyl acetate, polyvinyl butyral, and copolymer of vinyl chloride and vinyl acetate, and the plasticizer in the binder being non-oxidizing at atmospheric temperatures; and while maintaining the temperature within the approximate range of 300° F. to 350° F. pressing the resulting admixture into a sheet which on cooling is hard, compact, pliable and available for immediate use for floor covering and wall covering.

2. In a process of manufacturing floor and wall covering material, the steps comprising thoroughly admixing and heating together in absence of aqueous, volatile solvent, vulcanizing, and drying oil, material, at a temperature of about 300° F. to about 350° F. substantially 25% to substantially 50% by weight of a binder consisting of a plasticized thermoplastic, elastomeric polymer which polymer is selected from a group consisting of polyvinyl chloride, polyvinyl acetate, polyvinyl butyral, and copolymer of vinyl chloride and vinyl acetate, and the plasticizer in the binder being non-oxidizing at atmospheric temperatures; and substantially 50% to substantially 75% by weight of filler material consisting of pigment filler and about 30.9% to about 50% by weight of fibrous filler, and pressing the resulting mixture into a sheet which on cooling is hard, compact, pliable, and available for immediate use for floor covering and wall covering.

3. A plastic sheet material for floor and wall covering comprising: a hard, compact, pliable sheet prepared by the process of claim 2 and from the materials in the proportions set forth therein.

4. In a process of manufacturing floor and wall covering material, the steps comprising thoroughly admixing and heating together in absence of aqueous, volatile solvent, vulcanizing, and drying oil, material, at a temperature of about 300° F. to about 350° F. substantially 25% to substantially 50% by weight of a binder consisting of a plasticized thermoplastic, elastomeric polymer which polymer is selected from a group consisting of polyvinyl chloride, polyvinyl acetate, polyvinyl butyral, and copolymer of vinyl chloride and vinyl acetate, and the plasticizer in the binder being nonoxidizing at atmospheric temperatures; and substantially 50% to substantially 75% by weight of filler material consisting of pigment filler and about 30.9% to about 50% by weight of fibrous filler, to disperse the filler material substantially uniformly in the said binder.

5. A composition of matter for floor and wall covering prepared by the process of claim 4 and from the materials in the proportions set forth therein.

6. A composition of matter for floor and wall covering prepared by the process of claim 4 and from the materials set forth therein in the proportions of about 16 to about 38 parts by weight of the polymer, about 7 to about 18 parts by weight of plasticizer, and about 50 to about 75 parts by weight of the filler material.

7. A composition of matter for floor and wall covering prepared by the process of claim 4 and from the materials set forth therein in the proportions of about 23 parts by weight of the polymer, about 12 parts by weight of plasticizer, and about 65 parts by weight of the filler material.

8. A composition of matter for floor and wall covering prepared by the process of claim 4 and from the materials in the proportions set forth therein, the ratio of pigment filler to fibrous filler in said filler material by weight being two to one.

ROBERT K. PETRY.

REFERENCES CITED

The following references are of record in the file of this patent:

UNITED STATES PATENTS

| Number | Name | Date |
|---|---|---|
| 2,402,075 | Novotny | June 11, 1946 |
| 2,411,470 | Shaw | Nov. 19, 1946 |
| 2,413,219 | D'Alelio | Dec. 24, 1946 |